United States Patent [19]

Martin

[11] Patent Number: 4,909,458

[45] Date of Patent: Mar. 20, 1990

[54] DEVICE FOR THE ACCELERATION OF BODIES, ESPECIALLY A MOBILE CATAPULT FOR FLYING BODIES

[75] Inventor: Monkewitz Martin, Luzern, Switzerland

[73] Assignee: Schweizerische Eidgenossenschaft vertreten durch das Eidgenossische Flugzeugwerk, Emmen, Switzerland

[21] Appl. No.: 273,769

[22] Filed: Nov. 21, 1988

[30] Foreign Application Priority Data

Dec. 10, 1987 [CH] Switzerland .................. 40 815/87

[51] Int. Cl.$^4$ ............................................. B64F 1/06
[52] U.S. Cl. ...................................... 244/63; 254/387
[58] Field of Search ...................... 244/63, 111, 110 C, 244/110 A; 254/361, 362, 323, 328, 387

[56] References Cited

U.S. PATENT DOCUMENTS

| | | | |
|---|---|---|---|
| 2,289,766 | 7/1942 | Fieux | 244/63 |
| 2,292,374 | 8/1942 | Hagenbuch | 244/63 |
| 2,843,342 | 7/1958 | Ward | 244/63 |
| 2,856,139 | 10/1958 | Lockwood | 244/63 |
| 3,220,216 | 11/1965 | Byrne et al. | 244/110 A |
| 3,549,110 | 12/1970 | Cotton | 244/110 A |
| 4,678,143 | 7/1987 | Griffin | 244/63 |

FOREIGN PATENT DOCUMENTS 515648 12/1930 Fed. Rep. of Germany .
537383 6/1941 United Kingdom .................. 244/63

*Primary Examiner*—Joseph F. Peters, Jr.
*Assistant Examiner*—Anne Sartelle
*Attorney, Agent, or Firm*—Armstrong, Nikaido, Marmelstein, Kubovcik & Murray

[57] ABSTRACT

For acceleration of bodies along a track, a traction rope was wound onto a drum at the end of the track. During disengagement, the rope and the vicinity within range of the rotating rope were liable to suffer damage.

The device according to the invention serves in particular for the catapult-launching of flying bodies. A winding drum driven by hydraulic motors is arranged below the point of maximum track velocity of the flying body and moves the latter along the longitudinal track until it reaches lift-off velocity. A flat traction ribbon connected to a carriage causes the winding drum to reverse its sense of rotation, so that the carriage is braked along a short stretch.

The device can be mounted on a light truck and is electrohydraulically operated by the vehicle battery.

11 Claims, 5 Drawing Sheets

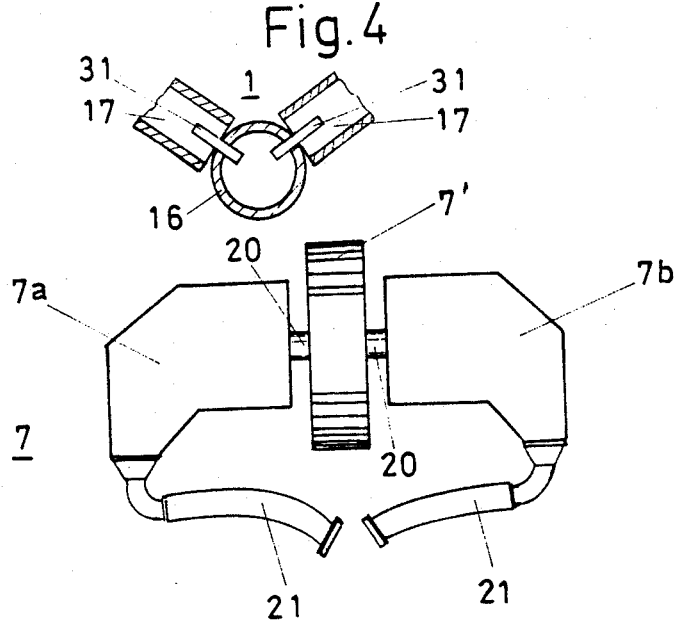
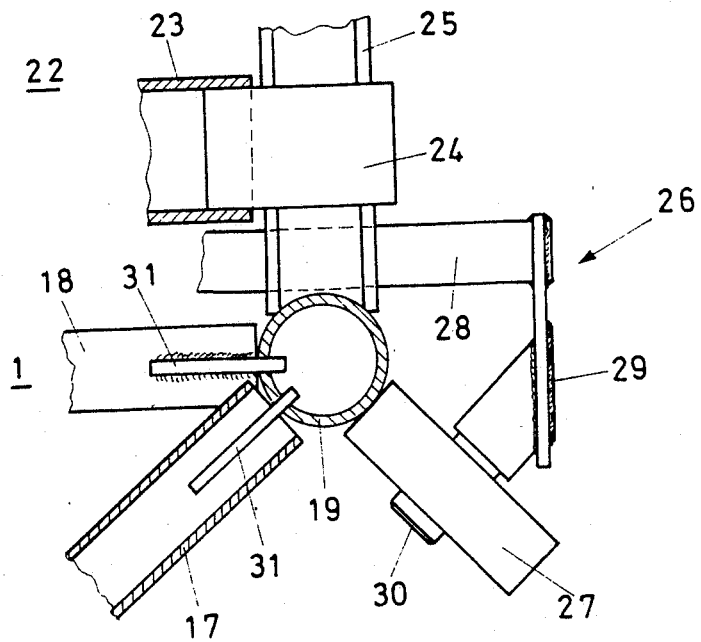

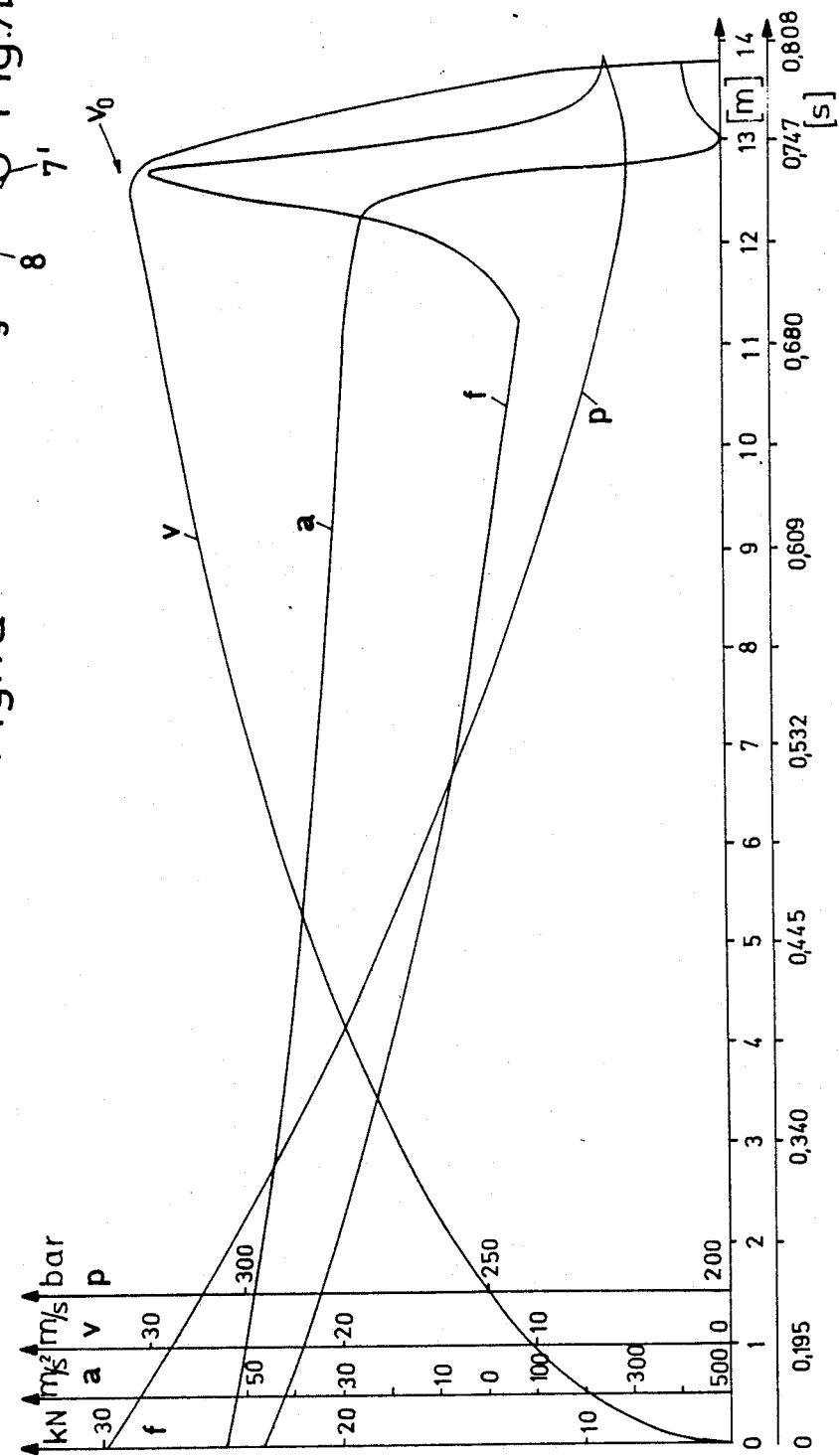

DEVICE FOR THE ACCELERATION OF BODIES, ESPECIALLY A MOBILE CATAPULT FOR FLYING BODIES

The present invention relates to a device for the acceleration of bodies on a longitudinal track, especially of aircraft for the purpose of launching, wherein this body is directly or indirectly accelerated along the longitudinal track via a windable drive rope by means of at least one stationary motor, and wherein the acceleration stretch has a first, positive, and a second, negative, acceleration zone.

The invention further relates to the preferred use thereof.

It is known to accelerate objects, flying bodies and the like by extraneous forces produced by mechanical, pneumatic or pyrotechnical drives, in order to reduce the length of their takeoff stretch. If rope devices, arranged at the end of a longitudinal track, are used for this purpose, it is seen that, during disengagement from the rope, of the accelerated body, damage is caused to the rope and in its vicinity.

It is one of the objects of the present invention to provide a device for the acceleration of bodies along a longitudinal track, which device is not affected by the disadvantage of the known art, achieves optimum acceleration within a short period of time and is especially suitable for the launching of unmanned civilian and military reconnaissance aircraft.

It is the intention to advantageously accelerate not only rollable or slidable flying bodies, but also those without rolling or sliding capability.

According to the invention, this is achieved in that the rope winding drum is arranged at least in proximity of the point of maximum track velocity of the body, and that the rope end, after the transition thereof from the zone of increasing track velocity to the zone of decreasing track velocity, brakes the winding drum and the motor counter to their original sense of rotation until the arrest thereof, and subsequently accelerates them in the opposite sense of rotation, whereby a portion of the rope unwinds from the winding drum and the kinetic energy still present is recovered in the motor.

The teaching of the invention can be applied directly in case of rollable or slidable bodies, as well as indirectly by using, e.g., a carriage for any other bodies.

It has been found advantageous to arrange the winding drum directly on the shaft of the motor and below the longitudinal track. This configuration facilitates in the simplest manner acceleration of the body or its carriage. After passing, on the longitudinal track, the point of location of the winding drum, the rope end acts counter to the original sense of rotation thereof, resulting in a rapid braking of the motor and, subsequently, reversal of its sense of rotation.

The flat ribbon is found to be useful because of its ideal winding behavior and optimal breaking strength. Particularly advantageous as drive elements are two coupled hydraulic machines.

These hydraulic machines function with equally high efficiency both as motors and as pumps and permit ideal recovery of the residual kinetic energy still present during braking of the carriage and/or the rope, after lift-off or disengagement of the body. The intermediate gas-pressure accumulator is in the simplest manner capable of making available high energy potentials and is also suitable to absorb the recovered energy.

Charging can be effected by a high-pressure pump of the smallest dimensions over an extended period of time.

Seen useful as drive is an electric motor which, designed as d.c. motor, is energized by a conventional vehicle battery.

Mobility of the device is facilitated by its being assembled from separate elements.

The device has been found particularly useful for the catapult-like launching of flying bodies, particularly of unmanned reconnaissance aircraft.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 4 is a schematic representation of the drive mechanism, including the winding drum;

FIG. 5 illustrates the carriage of FIG. 1 as mounted on a runner tube, in a partial cross-sectional view;

FIG. 7a represents the characteristic kinematic parameters of the drive and the carriage, and FIG. 7b shows the distances, drawn to abscissa scale, between deflection roller and winding drum;

Figure 1:
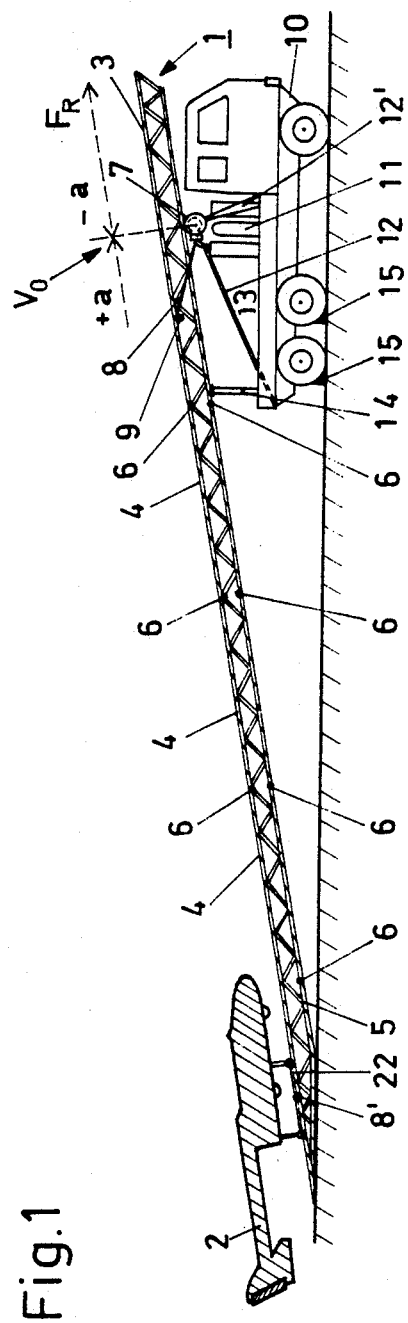
FIG. 1 shows a catapult for launching flying bodies, suitable for transport on light vehicles.
Figure 2:
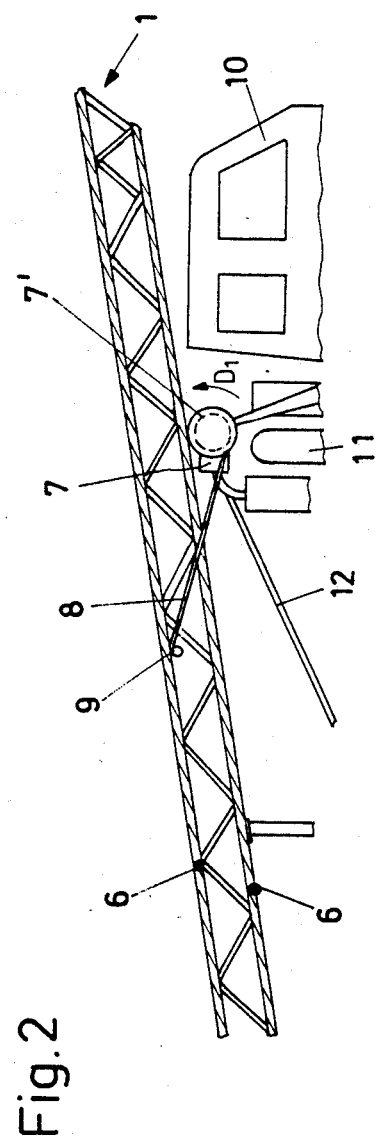
FIG. 2 is a section of the device of FIG. 1, to a larger scale, showing the drive region.

Referring now to the drawings, there is seen in FIG. 1 a longitudinal track 1 of a catapult, at the end of which is located a body 2, an unmanned reconnaissance plane mounted in flight direction $F_R$ on a carriage 22. The longitudinal track 1 is assembled from separate elements 3 to 5. Element 3 is mounted on the vehicle 10, while elements 4 and 5 are mobile, with element 5 being wedge-shaped on one of its ends and supporting the track 1 at that end. At coupling points 6, all elements 3 to 5 are provided with pins engaging in tubes and with locking devices. On the loading surface 13 of the transport vehicle 10 (Steyr-Pinzgauer 6×6) is mounted the hydraulic supply 11 and, above it, the motor 7, consisting of two hydraulic machines. Further seen is a winding drum 7, (comp. FIG. 2) onto which is wound a rope 8, being a commercially available flat ribbon made of polyester. The other end of the rope 8 is rotatably anchored to a mounting bar 8′ located at the center of the carriage 22. The rope 8 is furthermore led over a deflection roller 9 in a direction parallel to the longitudinal track 1. The latter is secured to the loading surface 13 by means of inclined supports 12, 12′ and a vertical support 14. Chocks 15 are placed underneath the rear wheels of the transport vehicle 10.

Details are more clearly discernible from the enlarged representation in FIG. 2. Also marked is the sense of rotation $D_1$ of the motor 7. This sense of rotation, as well as the guiding of the rope 8 over the deflection roller 9, correspond to the initial state, prevailing at the start of the body 2.

Figure 3:
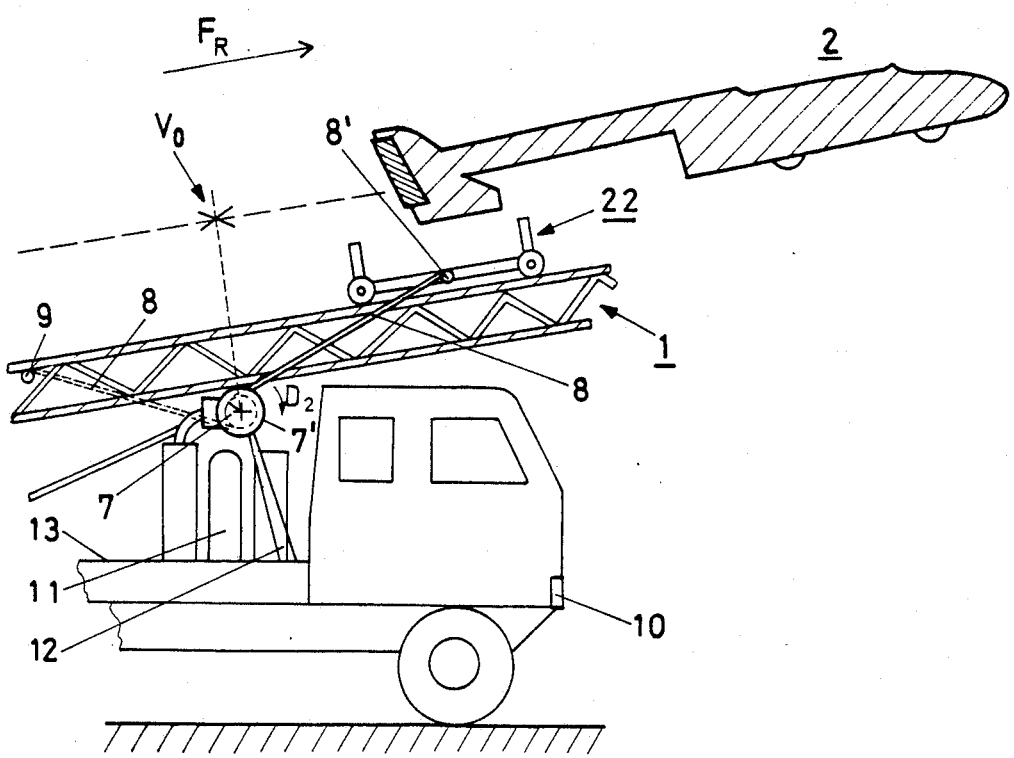
FIG. 3 represents FIG. 2 at the instant following lift-off of the flying body.

FIG. 3, in contradistinction, illustrates the state after detachment of the plane, including the corresponding guiding of the rope 8 during braking of the carriage 22. It can be seen that a reversal has taken place, from $D_1$ to $D_2$, of the sense of rotation of the motor 7, which reversal, upon the unwinding of the portion previously, during the acceleration of the body 2, wound onto the winding drum 7', causes the kinetic energy residual in the carriage 22 to be recovered, with the motor acting as hydraulic pump.

Details of the drive, as well as its relationship with the longitudinal track 1, can be seen in FIG. 4. Two commercially available hydraulic machines 7a and 7b (Volvo F11-250) are coupled with their shafts 20 via the winding drum 7'. The high-pressure lines 21 associated with motors 7a and 7b are connected to the hydraulic supply located below and not shown.

The longitudinal track 1 located above the motor 7 and shown in partial cross-section, has a triangular profile, of which are seen the inclined bracing tubes 17 and the base tube 16.

These bracing tubes 17 lead at their ends to the runner tube(s) 19 (see FIG. 5) which are provided with horizontal bracing tubes 18 and impart to the track a lattice-mast-like aspect. This lattice work is joined by welded-on gusset plates 31.

On the track 1 is located the carriage 22, essentially consisting of an axle tube 23 with stub axles 24 and, mounted thereon, a running wheel 25 with a polyurethane coating. Further provided are a lateral guide element 26 comprising a lateral guide roller 27 with a straight running face, a horizontal brace 28, a support flange 29 and a stub axle 30. Brace 28 is also mechanically connected to the axle tube 23.

Figure 6:
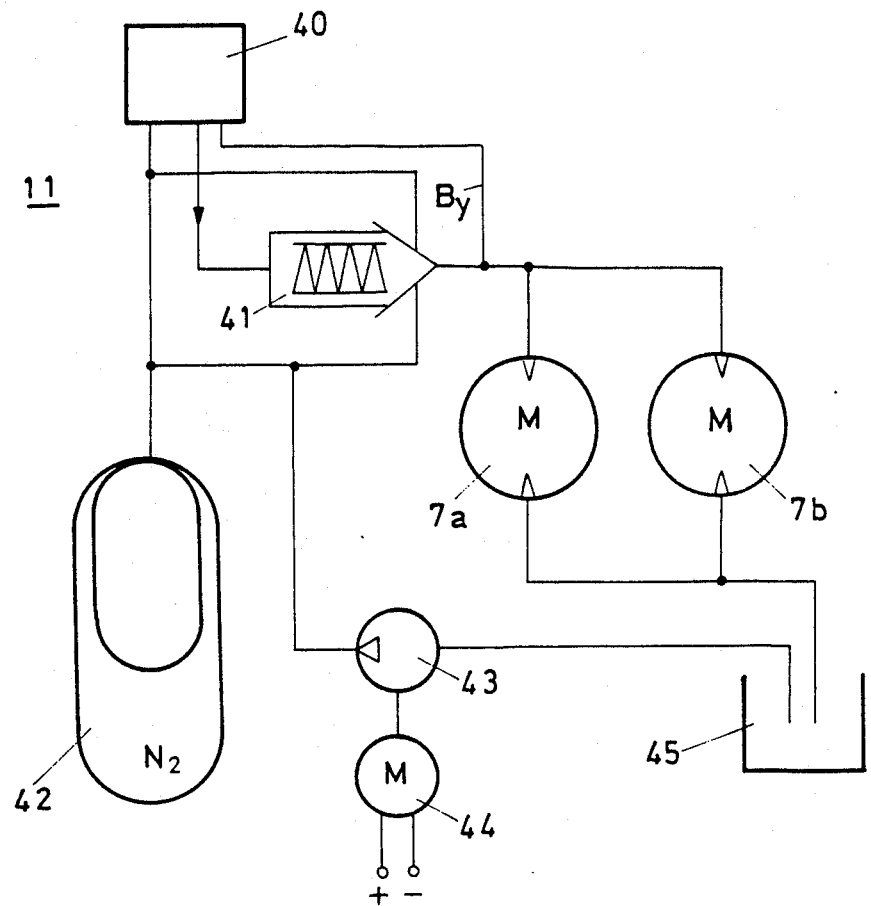
FIG. 6 is a schematic diagram of the hydraulic circuit, including its control members.

The hydraulic circuit in FIG. 6 schematically shows the energy supply of the device. A per se known valve control unit 40 is connected to a cartridge valve 41 (Mannesmann-Rexroth LC50) and an intermediate gas-pressure accumulator, specifically a bladder accumulator 42. To the outlet port of the cartridge valve are connected the two hydraulic machines 7a, 7b, the outlets of which lead into the oil reservoir 45 having a capacity of 20 l oil. The commercially available bladder accumulator 42 (OLAER. Typ IHV 24-330) permits charging to 330 bar.

As drive element serves a 24-volt electric motor 44 (American Bosch) with a shaft power of 0.5 kW. A small, commercially available piston pump (Leduc PB 36,5) having a throughput of 0.28 cm$^3$ per revolution serves as high-pressure pump and is rated for a maximum pressure of 350 bar.

All components described are commercially available, including the 75mm-wide polyester ribbon used as rope and having a minimum breaking strength of 8000 kg.

The diagram of FIG. 7a, the result of a computer simulation, shows all the characteristic parameters of the drive and the carriage It is scaled in such a way as to correlate the kinematic magnitudes with the length dimensions of the track 1. Prior to start-up, the electric motor 44 rotates the high-pressure pump 43 for 8 to 10 min. and charges the bladder accumulator to a pressure of a maximum of 300 bar. By means of a pretensioning sequence built-in in the valve control unit 40 and comprising a per se known bypass arrangement By (FIG. 6), the pressure is supplied to the hydraulic machines 7a and 7b during start-up in a "gentle" manner. The machines accelerate the carriage 22 with an initial acceleration of 54m/sec$^2$ along a distance of 12.5m for a period of time of 0.72 sec. At the instant of lift-off of the body 2 of the plane, acceleration a $= 19.5$m/sec$^2$ is brought to a negative value, which causes a lift-off of the plane at a velocity of $V_o$ of 30m/sec.

The guiding of the rope 8 by the roller 9 and the winding drum 7' is shown in FIG. 7b in a broken line. The carriage 22 having passed the winding drum 7', the rope 8 first acts as motor brake. After the reversal of the sense of rotation from $D_1$ to $D_2$, the motor 7 acts as oil pump, resulting in a slight recharging of the bladder accumulator 42. During the entire episode, the tension f of the rope 8, reaching a maximum value of 28kN, remains within the permissible safety limits.

All calculations listed above are based on a body 2 with a launching mass of 400 kg. With appropriate construction of the device and a suitable selection of the accumulator pressure it is possible to adapt the system limits to the circumstances within a wide range.

The device is characterized by a very high operational safety, by its self-sufficiency, its simple handling and maintenance-free operation. Its use is obviously not limited to linear tracks; by appropriate deflection of the rope or ribbon it is easy to realize also acceleration of bodies on curved tracks.

It will be evident to those skilled in the art that the invention is not limited to the details of the foregoing illustrative embodiments and that the present invention may be embodied in other specific forms without departing from the sPirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

NOMENCLATURE

1 Longitudinal tracks (catapult)
2 Body (unmanned aircraft)
3 Fixed element of 1
4 Separate element of 1 (mobile)
5 Support element of 1 (mobile)
6 Coupling points (with pins and locking devices)
7(a,b) Motor (hydraulic machines)
7' Winding drum
8 Rope (flat ribbon)
8' Anchoring bolt for 8 (ribbon end)
9 Deflection roller
10 Transport vehicle (Steyr-Pinzgauer 6x6)
11 Hydraulic supply
12,12' Slanting supports
13 Loading surface of 10
14 Vertical support
15 Chock
16 Base tube
17 Bracing tube (inclined)
18 Bracing tube (horizontal)
19 Runner tube 20 Shaft
21 High-pressure lines
22 Carriage
23 Axle tube of 22
24 Stub axle for 25
25 Running wheel (concave)
26 Lateral guide element
27 Lateral guide roller straight)
28 Horizontal brace
29 Support flange
30 Stub axle for 27
31 Gussed plate
40 Valve control (with pretensioning sequence)
41 Cartridge valve
42 Intermediate gas-pressure accumulator: Bladder accumulator
43 High-pressure pump (hydraulic piston pump)
44 Electric motor (DC)
45 Oil reservoir
By Bypass
$D_1$ 1st sense of rotation of 7
$D_2$ 2nd sense of rotation of 7
$F_R$ Direction of flight
$V_o$ Maximum track velocity
V Velocity of carriage 22 (or rope end)
a Acceleration (of 22 or 8')
f Rope tension (ribbon)
p Oil Pressure (motor)

I claim:

1. A device for accelerating bodies on a longitudinal track, especially aircraft for purpose of takeoff, wherein said body is directly or indirectly accelerated along said longitudinal track via a windable drive rope by means of at least one stationary motor, and wherein the acceleration stretch has a first, positive, and a second, negative, acceleration zone, characterized in that the rope winding drum is arranged at a position below the longitudinal track and at least in proximity of the point of maximum track velocity of said body, and that the rope end, after the transition thereof from the zone of increasing track velocity to the zone of decreasing track velocity, brakes said winding drum and said motor counter to their original sense of rotation until the arrest thereof and, subsequently accelerates them in the opposite sense of rotation, whereby a portion of said rope unwinds from said winding drum.

2. The device as claimed in claim 1, characterized in that the winding drum is arranged on the shaft of the motor, and that at least one deflection roller is provided for said rope on the side of the positive track acceleration.

3. The device as claimed in claim 2, characterized in that said rope is in the form of a flat ribbon made of polyester.

4. The device as claimed in claim 1, 2 or 3 characterized in that said motor consists of two hydraulic machines.

5. The device as claimed in claim 4, characterized in that, for transport of said body, a carriage is attached to the end of said rope, the kinetic energy of which carriage is at least partly recovered in said motor in the zone of decreasing velocity, after reversal of the sense of rotation thereof.

6. The device as claimed in claim 4, characterized in that the oil supply of said hydraulic drives takes place via an intermediate gas-pressure accumulator.

7. The device as claimed in claim 6, characterized in that charging of said intermediate gas-pressure accumulator is effected by a high-pressure pump working on the piston principle.

8. The device as claimed in claim 7, characterized in that said high-pressure pump is driven by an electric motor.

9. The device as claimed in claim 8, characterized in that said electric motor is a d.c. motor energized by a vehicle battery.

10. The device as claimed in claim 1, characterized in that said longitudinal track is assembled of separate elements which are joined to one another at coupling points.

11. The use of the device as claimed in claim 1, 2 or 3 as a mobile catapult for flying bodies on vehicles.

* * * * *

UNITED STATES PATENT AND TRADEMARK OFFICE
CERTIFICATE OF CORRECTION

PATENT NO.   : 4,909,458
DATED        : March 20, 1990
INVENTOR(S)  : Martin MONKEWITZ It is certified that error appears in the above-identified patent and that said Letters Patent is hereby corrected as shown below:

On the cover page, above Item [54], "Martin" should read --Monkewitz--;

Item [75], "Monkewitz Martin" should read --Martin Monkewitz--;

Item [30], "40 815/87" should read --04 815/87--.

Column 1, line 12, "first. positive" should read --first, positive--.

Column 2, line 61, "drum 7," should read --drum 7'--.

Column 3, line 52, "(OLAER. Typ" should read --(OLAER, Typ--.

Column 4, line 38, "sPirit" should read --spirit--.

Column 5, line 8, "roller straight)" should read --roller (straight)--;

line 15, "accumulator:" should read --accumulator;--;

line 21, "7" should read --7'--;

line 22, "7" should read --7'--.

Signed and Sealed this

Eighteenth Day of June, 1991

Attest:

HARRY F. MANBECK, JR.

Attesting Officer      Commissioner of Patents and Trademarks